July 16, 1968 W. FIDI ET AL 3,393,271

FREQUENCY RESPONSE MODIFYING ARRANGEMENT
FOR CONDENSER MICROPHONES

Filed Nov. 13, 1964 2 Sheets-Sheet 1

INVENTOR
WERNER FIDI
BERNHARD WEINGARTNER

BY McGlew and Toren
ATTORNEYS

INVENTOR
WERNER FIDI
BERNHARD WEINGARTNER
BY McGlew and Toren
ATTORNEYS 3,393,271

FREQUENCY RESPONSE MODIFYING ARRANGEMENT FOR CONDENSER MICROPHONES

Werner Fidi, Baden, near Vienna, and Bernhard Weingartner, Vienna, Austria, assignors to Akustische u Kino-Gerate Gesellschaft m.b.H., Vienna, Austria Filed Nov. 13, 1964, Ser. No. 411,025
Claims priority, application Austria, Nov. 29, 1963, A 9,555/63
6 Claims. (Cl. 179—1)

ABSTRACT OF THE DISCLOSURE

A condenser microphone drives a cathode follower having a frequency-responsive network across its output which provides a negative feedback that varies input impedance with frequency, but which maintains a frequency invariant output impedance to the next stage.

Figure 1:
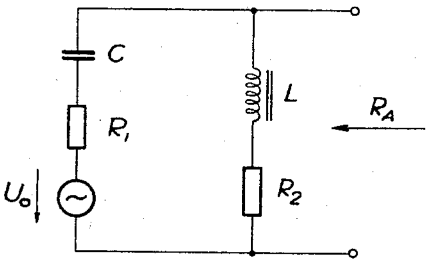

When a particularly high quality is required in electroacoustic transmitting installations (studio operation), high-grade condenser microphones are almost exclusively used. In this case it has been found suitable to effect a strong attenuation, particularly of the bass frequencies, below a predetermined lower limit, in order to suppress the effect of any pressure peaks which may occur in this frequency range, e.g., by the operation of air conditioning systems. In accordance with standard specifications, such an attenuation should be −7 or −12 decibels at 50 cycles relative to the standard level. The influence of strong fluctuations of the unidirectional pressure must be suppressed because such fluctuations would result in large deflections of the diaphragm, which give rise to intolerable distortions in the input tube. It is desirable to provide for the required bass attenuation before the first amplifier tube, in its grid circuit, in order to avoid an inadmissibly large overloading or shifting of the operating point.

This method has previously been implemented by connecting a network consisting of resistance-capacitance circuits between the output of the microphone and the input of the amplifier. This arrangement has the disadvantage that such a network does not only involve a reduction of the level but, owing to the higher resistance of the grid circuit, hardly enables an electric remote control. Besides, another conductor would be required in the cable. For this reason, resistance-capacitance circuits used in the grid circuit of the preamplifier tube requires a switching of the bass attenuator directly at the microphone or require a mechanical control of a capacitance.

The invention proposes another method, which is free of the disadvantages set forth hereinbefore and resides in clipping the bass frequencies at the output of the amplifier and providing a corresponding back effect or reflected impedance on the input. This second method, however, makes sense only if the back effect can act on the input of the amplifier in such a manner that any distortion which occurs is reduced. Besides, a constant, frequency-independent output resistance is required.

In order to accomplish this object, the invention proposes an arrangement for a remotely-operable modification of the frequency response of a condenser microphone, which arrangement comprises a frequency response modifying network, and a cathode follower amplifier stage connected between the output of the condenser microphone and said network, which network has a back effect on the input of the cathode follower stage.

To attenuate the bass frequencies, the network according to the invention includes in its series branch a capacitance and, in the succeeding shunt branch, an inductance in series with a resistance. According to another feature of the invention, the network is designed so that the resistance in series with the inductance is approximately as large as the square root of the ratio of the inductance in the shunt branch to the capacitance in the series branch. This relation applies when the inductance is expressed in henries, the resistance in ohms, and the capacitance in farads.

When it is desired to attenuate treble frequencies, it is sufficient to interchange the capacitance and inductance in the network. The network succeeding the cathode follower tube may be designed to provide for any desired frequency response. More particularly, a plurality of similar networks may be connected in series to provide for an increase or decrease of the frequency response within a desired frequency range with any desired slope.

Owing to the low resistance of the output of a cathode follower stage, the frequency response modifying network may be mounted outside the microphone housing at a substantial distance from the microphone to enable a simple, troublefree remote control of the frequency response.

Figure 2:
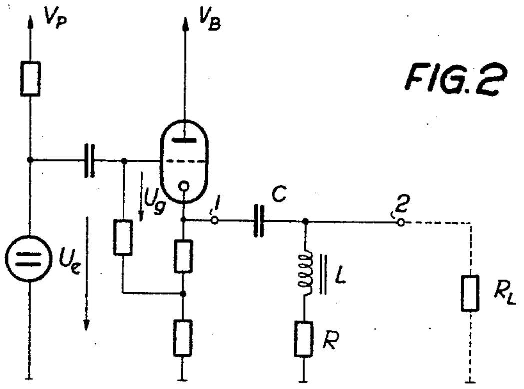
Figure 3:
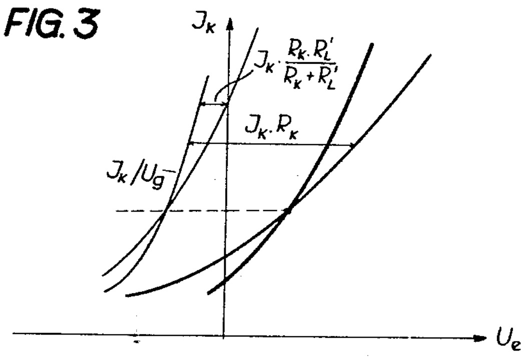
Figure 4:
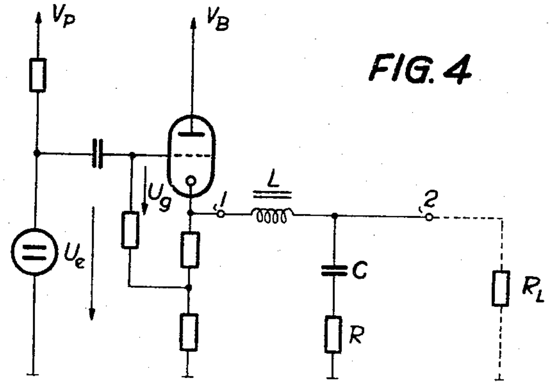
Figure 5:
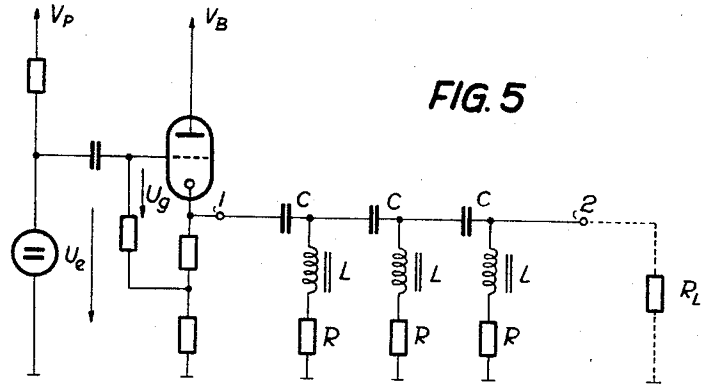
Figure 6:
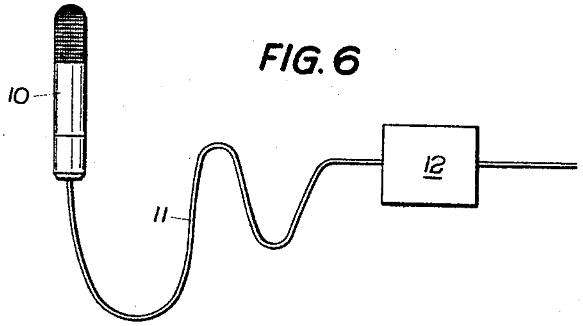

Further features of the invention are apparent from the subsequent description with reference to the accompanying drawing, in which FIG. 1 is a basic circuit diagram of a bass attenuator in an illustrative embodiment of the invention, FIG. 2 shows the actual circuit diagram thereof, FIG. 3 shows operating characteristics of a cathode follower stage for an explanation of the invention, FIG. 4 shows a practical circuit diagram of a treble attenuator, FIG. 5 shows a circuit which comprises a plurality of similar networks connected in series, and FIG. 6 is a diagrammatic view showing an arrangement in which a microphone and networks are spaced apart.

The circuit diagram of FIG. 1 shows the basic elements of an arrangement according to the invention. The output of the amplifier is represented by the voltage source $U_0$ and the resistor $R_1$. According to the invention, the amplifier is succeeded by a network, which for bass attenuation consists of a capacitor C in a series branch and a series connection of a resistor $R_2$ and an inductance L in a shunt branch, which is parallel to the output terminals of the network. The invention is based on the following considerations: It is known that, in a cathode follower stage, the coefficient of non-linear distortion has a certain degree of independence of the load resistance $R_L$ only at low alternating current voltages. In this case, $R_L$ may be of the order of the matched resistance. In the case of relatively high input voltages, a change of the load resistance will result in a great distortion. This behavior may be explained with reference to the characteristic curves shown in FIG. 3. The known linearizing effect of cathode follower stages is determined by the value of the cathode resistance $R_K$, amounting to some 10 kiloohms. In the absence of an output load, i.e., under no-load conditions, a maximum undistorted output voltage is obtained, which corresponds approximately to the operating voltage ($V_B$). If the output of the stage has connected to it a load resistance even of only some 100 ohms, the maximum undistorted voltage at the output will be much reduced. This behavior of the cathode follower stage is utilized in the invention. As is shown in FIG. 2, the network described above is connected, according to the invention, to the cathode resistor of the tube. When measured at point 1, the value of the terminating resistance represented by the network increases and the coefficient of non-linear distortion is improved as the frequency is reduced. On the other hand, the source impedance measured at point 2 remains constant if the network is properly designed, as will be stated hereinafter. The back effect on the input required in this arrangement may be explained in that the magnitude of the feedback voltage is frequency-dependent to provide for the required, frequency-dependent back effect on the grid circuit.

The network shown in FIG. 2 meets the requirement for a frequency-independent output impedance when $R_1=R_2=R_A$ and $R_L=R^2C$, if the values are expressed in the units indicated above. A bass attenuation of about 3 decibels will be obtained when $$R=\sqrt{\frac{L}{C}} \text{ at the angular frequency } \omega=\frac{1}{\sqrt{LC}}$$

When L and C are interchanged in the arrangement according to the invention, a treble attenuator will be obtained which has also a constant output impedance. Such an arrangement is illustrated in FIG. 4.

An important advantage of the invention resides in the low resistance of the network. When using a cathode follower stage according to the invention, a remotely controlled bass attenuation can be effected without need for an additional conductor in the cable if the network according to the invention is not mounted directly in the microphone housing 10 but in a separate switchbox 12, e.g., on the control panel at the control desk. This is diagrammatically shown in FIG. 6. A plurality of similar networks may be connected in series to effect any desired increase of the bass attenuation or an increase of the linear load range. Such a circuit is illustrated in FIG. 5.

A practical example for the calculation of the components of the network is given below:

It may be assumed that a bass attenuation of −3 decibels at 150 cycles per second is desired with respect to 1000 cycles per second. Then, $$R_1=R_2=R_L=200 \text{ ohms}$$

$$\omega=\frac{1}{\sqrt{LC}}=942\ \frac{1}{\text{sec.}}$$

$$R=\sqrt{\frac{L}{C}}=200 \text{ ohms}$$

$$L=\frac{R}{\omega}=\frac{200}{942}=0.2124 \text{ henry}$$

$$C=\frac{1}{\omega R}=\frac{1}{942\times 200}=5.3\times 10^{-6} \text{ farad}=5.3 \text{ picofarads}$$

What is claimed is:

1. A frequency response modifying arrangement, for attenuating the low frequency response of condenser microphones, said arrangement comprising, in combination, a cathode follower amplifier stage having an input for coupling to an output of a condenser microphone, a cathode follower output and feedback resistance connecting its output to its input; and at least one frequency response modifying network having an input connected to the cathode follower output of said amplifier stage and having an output; said frequency response modifying network comprising a series branch, including a first reactance, connected between the network input and the network output, and a shunt branch connected to that end of the series branch remote from the input of said network and in parallel with the network output, said shunt branch including a series connection of a second reactance and a resistance; one of said reactances being a capacitance and the other of said reactances being an inductance; said network providing a constant, frequency-independent impedance across its output; the terminal impedance represented by said network at the input terminal thereof connected to the cathode follower output increasing with decreasing frequency whereby the coefficient of non-linear distortion of said cathode-follower amplifier stage is improved with decreasing frequency, due to the fact that the magnitude of the feedback voltage is frequency-dependent to provide a frequency-dependent back effect on the input of said cathode-follower amplifier stage.

2. A frequency response modifying arrangement as set forth in claim 1, including plural frequency response modifying networks, the first frequency response modifying network having its input connected to the cathode follower output of said amplifier stage and each succeeding frequency response modifying network having its input terminal connected to the output terminal of the immediately preceeding frequency response modifying network.

3. A frequency response modifying arrangement as set forth in claim 1, wherein $R_1=R_2=R_A$, in which $R_1$ is the resistance of said cathode follower output, $R_2$ is the resistance in said shunt branch of said network and $R_A$ is the feedback resistance to the input of said cathode-follower amplifier stage; and wherein $L=R^2C$ at $\omega=1/\sqrt{L/C}$, where L is the value of said inductance, R is the value of said resistance of said shunt branch of said network, C is the value of said capacitance, and $\omega$ is the angular frequency.

4. A frequency response modifying arrangement as set forth in claim 1, in which said resistance in ohms is substantially as large as the square root of the ratio of said inductance in henries to said capacitance in farads.

5. A frequency response modifying arrangement as set forth in claim 1, in which said first reactance is a capacitance and said second capacitance is an inductance, so that said network is adapted to effect bass attenuation.

6. A frequency response modifying arrangement as set forth in claim 1, in which said first reactance is an inductance and said second reactance is a capacitance, so that said network is adapted to effect treble attenuation.

References Cited

UNITED STATES PATENTS

| | | | |
|---|---|---|---|
| 2,372,419 | 3/1945 | Ford | 330—94 |
| 2,384,263 | 9/1945 | Schlesinger | 330—94 |
| 2,508,586 | 5/1950 | Venkelasen. | |
| 2,700,704 | 1/1955 | Minter | 328—213 |
| 3,207,848 | 9/1965 | Boré. | |

OTHER REFERENCES

Patent Disclosure, 741,080, Morgan, Sept. 20, 1949.

KATHLEEN H. CLAFFY, *Primary Examiner.*

R. P. TAYLOR, *Assistant Examiner.*